US011530937B2

(12) United States Patent
Perez et al.

(10) Patent No.: US 11,530,937 B2
(45) Date of Patent: Dec. 20, 2022

(54) DIRECTIONAL PROBE FOR HIGH TEMPERATURE FLOWS

(71) Applicant: Purdue Research Foundation, West Lafayette, IN (US)

(72) Inventors: Guillermo Paniagua Perez, West Lafayette, IN (US); David Gonzalez Cuadrado, West Lafayette, IN (US); Valeria Andreoli, West Lafayette, IN (US); James Braun, West Lafayette, IN (US); Zhe Liu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/755,718

(22) PCT Filed: Oct. 12, 2018

(86) PCT No.: PCT/US2018/055746
§ 371 (c)(1),
(2) Date: Apr. 13, 2020

(87) PCT Pub. No.: WO2019/075429
PCT Pub. Date: Apr. 18, 2019

(65) Prior Publication Data
US 2021/0190557 A1  Jun. 24, 2021

Related U.S. Application Data

(60) Provisional application No. 62/571,774, filed on Oct. 12, 2017.

(51) Int. Cl.
*G01F 1/34* (2006.01)
*G01F 15/00* (2006.01)

(52) U.S. Cl.
CPC .............. *G01F 1/34* (2013.01); *G01F 15/006* (2013.01)

(58) Field of Classification Search
None
See application file for complete search history.

(56) References Cited

U.S. PATENT DOCUMENTS 6,480,793 B1 * 11/2002 Martin .................... G01F 1/704
                                                                702/45
2007/0095144 A1 * 5/2007 Oboodi ................. G01L 9/0055
                                                               73/715

(Continued)

OTHER PUBLICATIONS

Liu, Z. et al. "Design of Directional Probes for High-Frequency Turbine Measurements" Journal of Engineering for Gas Turbines and Power; Jan. 2018, vol. 140; First Published Sep. 19, 2017; figures 20(a) and 20(b); p. 011601-1, para 1-2; p. 011601-8 , para 1 and 2; p. 011601-10, para. 1.*

(Continued)

*Primary Examiner* — Harshad R Patel
(74) *Attorney, Agent, or Firm* — Purdue Research Foundation

(57) ABSTRACT

A flow measurement apparatus comprising an elongated mounting stem having an inner stem cavity, the mounting stem configured to be mounted in an area of flow to be measured. A probe housing is mounted to an outer surface of the mounting stem and positioned on an upstream side of the mounting stem. The probe housing has a first hole near a center point of the housing and a second, third and fourth hole positioned near the perimeter of the housing. A fifth hole is located on a downstream side of the mounting stem. At least five pressure sensors and a plurality of pressure tapping tubes connecting the holes to the corresponding pressure sensors are included.

25 Claims, 9 Drawing Sheets

(56) References Cited

U.S. PATENT DOCUMENTS

| | | | | |
|---|---|---|---|---|
| 2008/0198896 | A1* | 8/2008 | Nair | H05K 7/207 374/141 |
| 2010/0056732 | A1* | 3/2010 | McElvain | C08F 10/00 526/64 |
| 2012/0085881 | A1* | 4/2012 | Tatry | F16F 9/006 248/636 |
| 2014/0251000 | A1* | 9/2014 | Doolittle | G01L 15/00 73/178 R |
| 2015/0060009 | A1* | 3/2015 | Shelnutt | H05K 7/20809 165/11.1 |
| 2015/0292971 | A1* | 10/2015 | Hurst | G01L 19/0609 73/708 |
| 2016/0153602 | A1* | 6/2016 | Ahuja | F16L 55/02754 138/44 |

OTHER PUBLICATIONS

Paniagua, G. et al., "Digital Compensation of Pressure Sensors in the Time Domain," Experiments in Fluids, 32: 417-424 (2002).

Ainsworth, R.W. et al., "Unsteady Pressure Measurement," Measurement Science and Technology, 11: 1055-1076 (2000).

Sieverding, C.H. et al., "Measurement Techniques for Unsteady Flows in Turbomachines," Experiments in Fluids, 28:285-321 (2000).

Dominy, R.G. et al., "An Investigation of Factors Influencing the Calibration of 5-hole Cone and Pyramid Probes," ASME J. Turbomachinery, 115: 513-9 (Jul. 1993); presented at the 37th international Gas Turbine and Aeroengine Congress and Exposition, Cologne, Germany, Jun. 1-4, 1992.

Villafañe, L. et al., "Development of Experimental Techniques for the Characterization of Helicoidal Fin Arrays in Transonic Flow Conditions". Proceedings of the 47th AIAA/ASME/SAE/ASEE Joint Propulsion Conference & Exhibit, Jul. 31-Aug. 3, 2011, AIAA-2011-6093, San Diego, CA, USA (2011).

Delhaye, D. et al., "Enhanced Performance of Fast-Response 3-hole Wedge Probes for Transonic Flows in Axial Turbomachinery," Experiments in Fluids, 50:163-177 (2011); published online Jun. 15, 2010.

Bergh, H. et al., "Theoretical and Experimental Results for the Dynamic Response of Pressure Measuring Systems," Netherlands National Aero-and Astronautical Research Institute (Nationaal Luchten Ruimtevaartlaboratorium), Report NLR-TR F.238 (1965).

Kost, F. "Probes in Transonic Flow," XIX Biannual Symposium on Measuring Techniques in Turbomachinery, Transonic and Supersonic Flow in Cascades and Turbomachines, Rhode-St-Genèse, Belgium (2008).

Storn, R. et al., "Differential Evolution—A Simple and Efficient Heuristic for Global Optimization over Continuous Spaces," Journal of global Optimization, 11: 341-359 (1997).

Celik, I. B. et al., "Procedure for Estimation and Reporting of Uncertainty due to Discretization in CFD Applications," Journal of Fluids Engineering, vol. 130 (Jul. 2008).

Clark, J.P. et al., "Assessing Convergence in Predictions of Periodic-Unsteady Flowfields," ASME, Journal of Turbomachinery, 129(4), 740-749 (Oct. 2007); Paper presented at the 2006 IGTI Turbo Expo, Paper No. GT2006-90735.

Richter, A. et al., "Fluctuating Forces on a Rigid Circular Cylinder in Confined Flow," J. Fluid Meeh, vol. 78, part 3, pp. 561-576 (1976).

Liu, Z. et al., "Design of Directional Probes for High-Frequency Turbine Measurements," Proceedings of ASME Turbo Expo 2017: Turbomachinery Technical Conference and Exposition, GT2017-64680, Jun. 26-30, 2017, Charlotte, NC, USA.

Klir, G.J. et al., "Fuzzy Sets and Fuzzy Logic: Theory and Applications," Prentice Hall PTR, Upper Saddle River, NJ, USA (1995). Four part document: Part 1: pp. 1-172 (189 pages).

Klir, G.J. et al., "Fuzzy Sets and Fuzzy Logic: Theory and Applications," Prentice Hall PTR, Upper Saddle River, NJ, USA (1995). Four part document: Part 2: pp. 173-338 (166 pages).

Klir, G.J. et al., "Fuzzy Sets and Fuzzy Logic: Theory and Applications," Prentice Hall PTR, Upper Saddle River, NJ, USA (1995). Four part document: Part 3: pp. 339-497 (159 pages).

Klir, G.J. et al., "Fuzzy Sets and Fuzzy Logic: Theory and Applications," Prentice Hall PTR, Upper Saddle River, NJ, USA (1995). Four part document: Part 4: pp. 498-574 (77 pages).

* cited by examiner probe on the left (stem+head) and on the right the sensors inside the head + the Kulite 5 (which is the pressure sensors at the back of the probe)

Tube 5 with chamfered hole to minimize the error at large flow angles

DIRECTIONAL PROBE FOR HIGH TEMPERATURE FLOWS

CROSS-REFERENCE TO RELATED APPLICATIONS

The present application is a U.S. National Entry under 35 U.S.C. § 371 of PCT/US2018/055746, filed Oct. 12, 2018, and is related to and claims the priority benefit of U.S. Provisional Application No. 62/571,774, filed Oct. 12, 2017, the contents each of which are hereby incorporated by reference in its entirety into the present disclosure.

TECHNICAL FIELD

The present disclosure generally relates to a high temperature flow measurement devices, such as those used to measure flow in gas turbine engines.

BACKGROUND

Aerodynamic probes are ubiquitous in gas turbine monitoring due to their robustness and easiness of operation. However, the intrusion into the flow path creates a steady-state pressure distortion, unsteady phenomena associated to the vortex shedding. To protect the sensor from a harsh environment (hot flow and particles), and allow a higher spatial resolution (the smallest sensor is in the mm-scale), the sensors are typically mounted within the probe, recessed from the surface. However, these sub-surface mounted sensors cause a significant reduction in the time resolution of the probe, compared to the flush-mounted sensors. Therefore, improvements are needed in the field.

SUMMARY

According to various aspects, a flow measurement apparatus is provided, comprising an elongated mounting stem having an inner stem cavity, the mounting stem configured to be mounted in an area of flow to be measured, a probe housing mounted to an outer surface of the mounting stem and positioned on an upstream side of the mounting stem, the probe housing comprising a first hole near a center point of the housing and a second, third and fourth hole positioned near the perimeter of the housing. A fifth hole located on a downstream side of the mounting stem and at least five pressure sensors are also provided. A plurality of pressure tapping tubes connect the holes to the corresponding pressure sensors.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION

Figure 1:
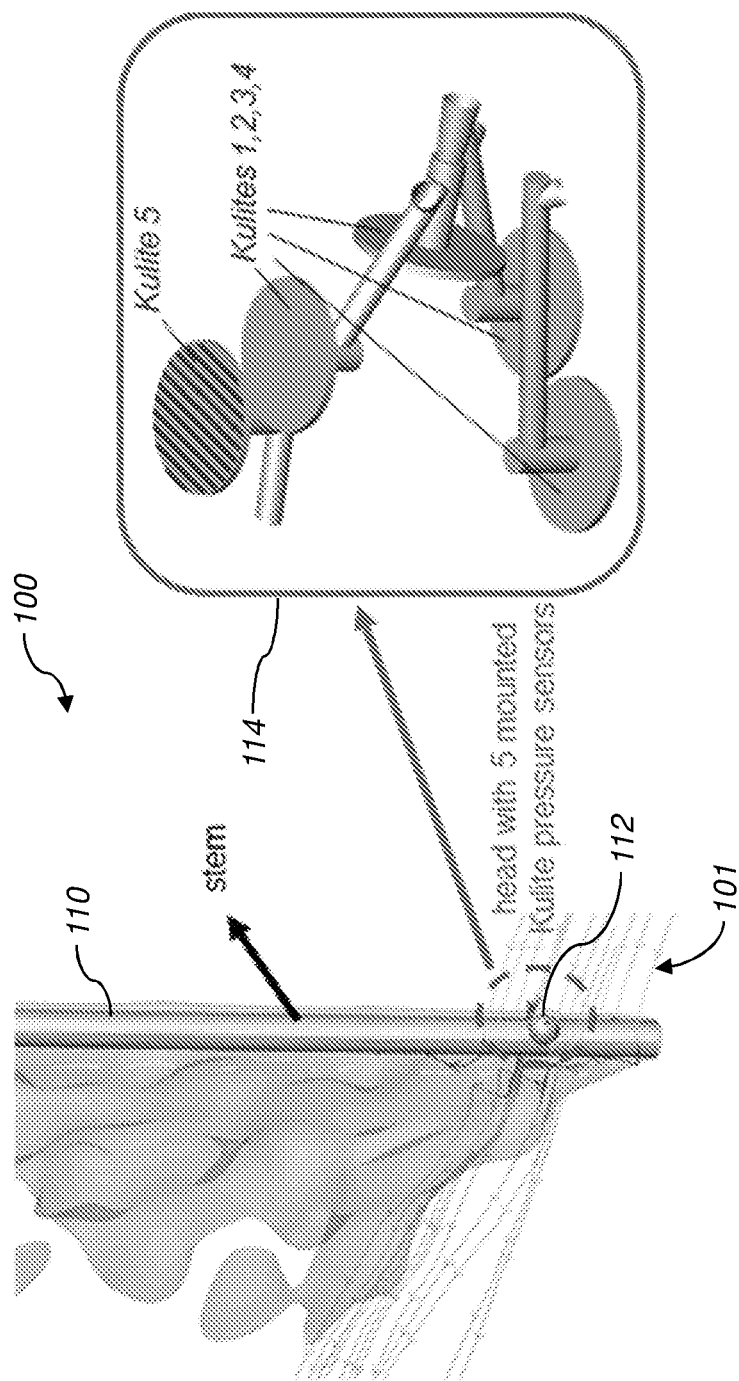
FIG. 1 shows a flow measurement apparatus according to one embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the need for a more accurate and reliable flow measurement system, disclosed herein is a novel flow measurement device having five pressure sensors mounted within a housing, with the housing mounted on an exterior surface of a support structure, such as a tube stem, within an area containing a flow to be measured.

Figure 2A:
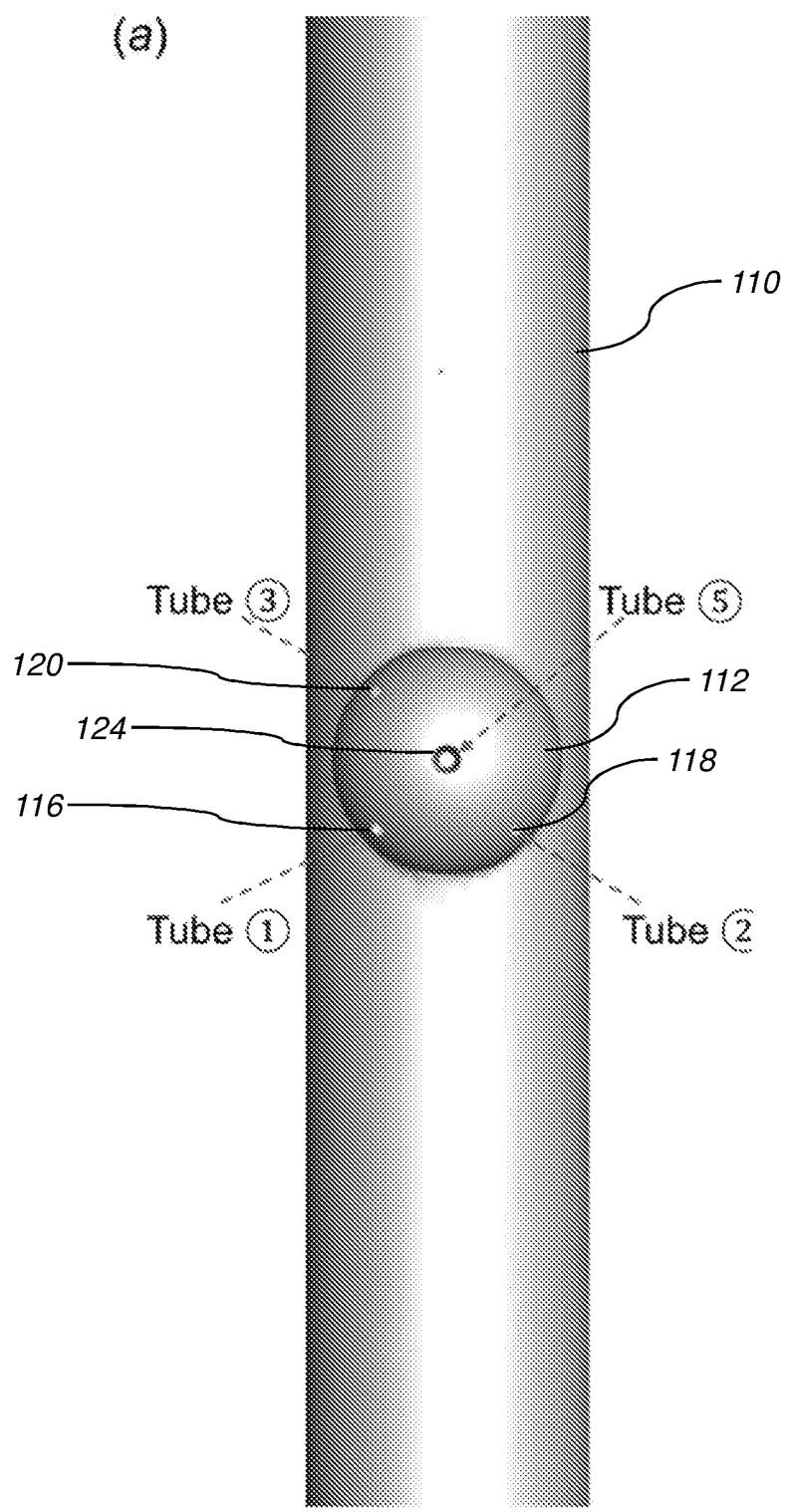
FIG. 2A shows a front outer view of the flow measurement apparatus of FIG. 1.
Figure 2B:
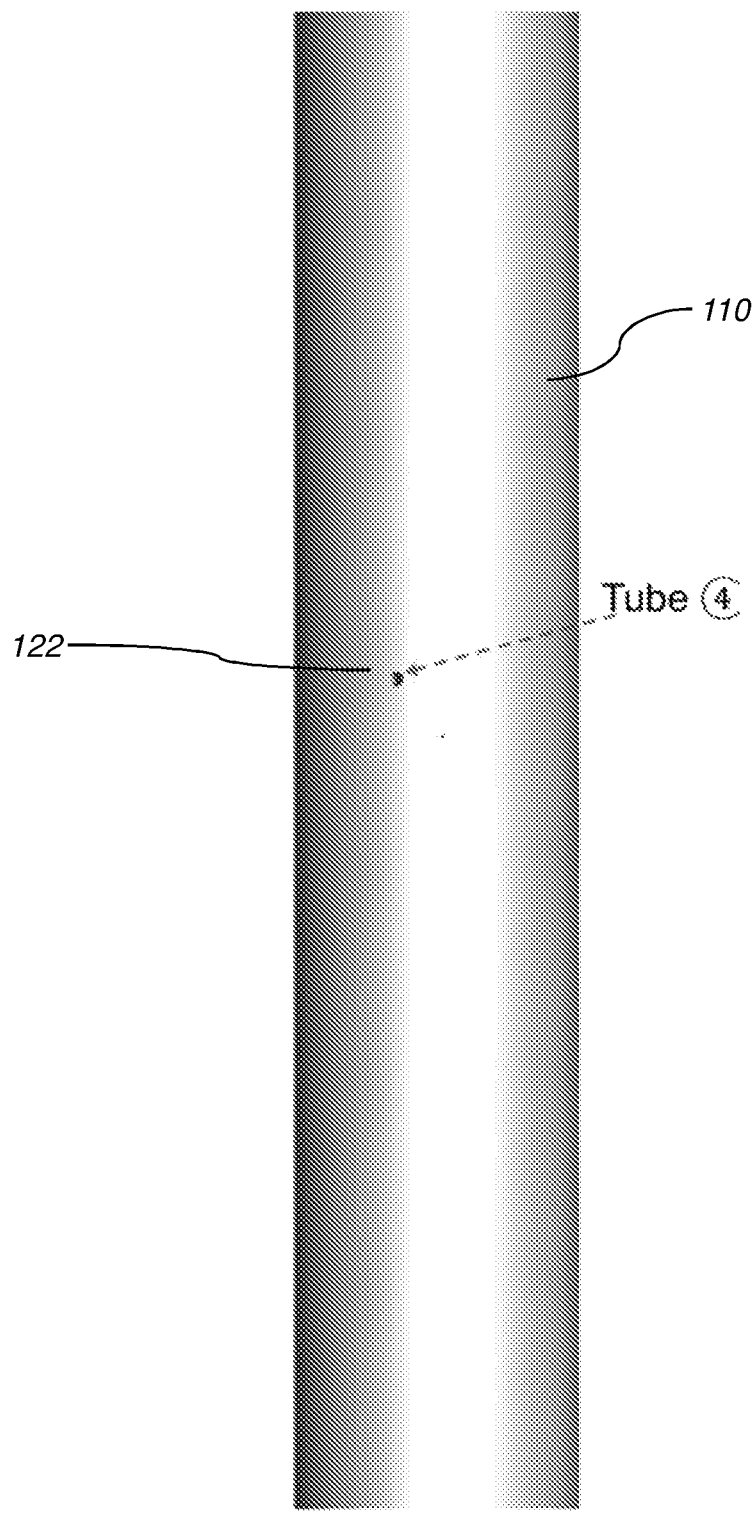
FIG. 2B shows a rear outer view of the flow measurement apparatus of FIG. 1.
Figure 3:
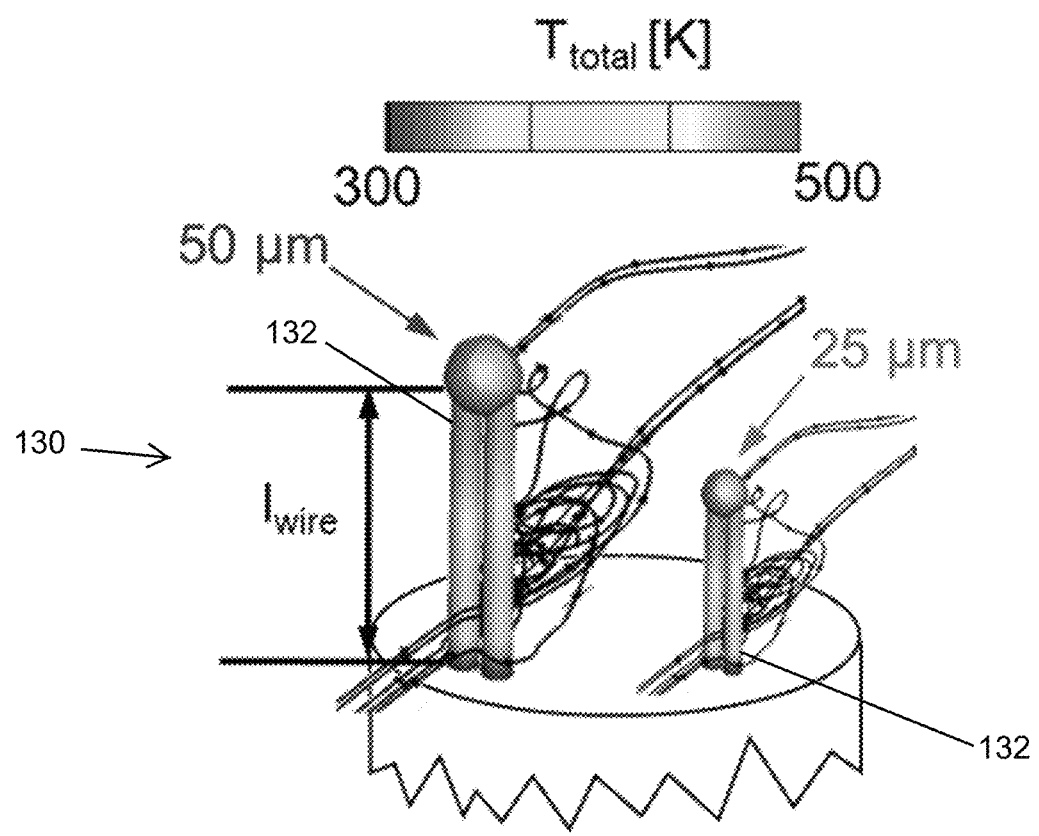
FIG. 3 shows a dual wire thermocouple apparatus according to one embodiment.
Figure 4:
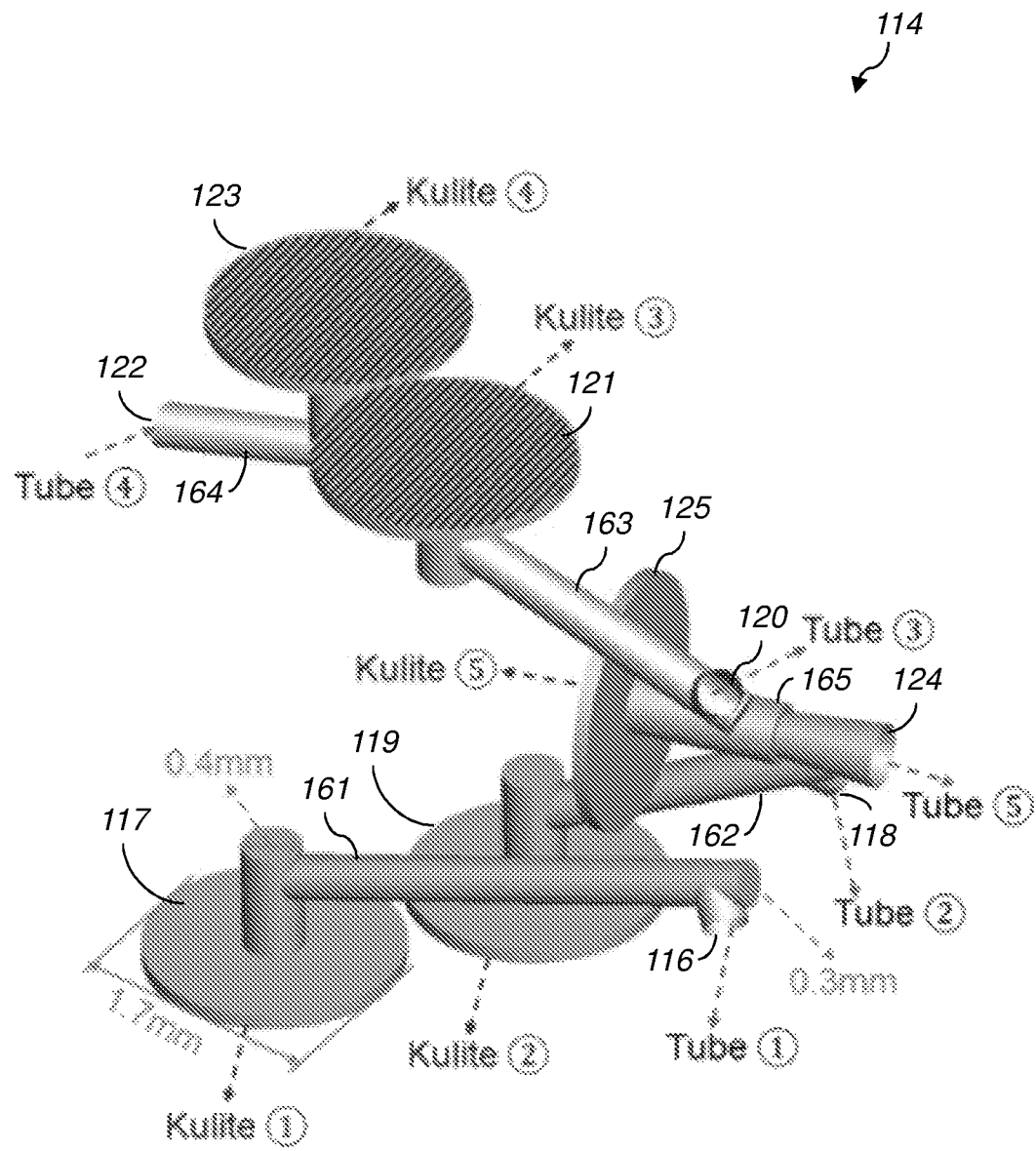
FIG. 4 shows the inner tubing and sensor arrangement of the flow measurement apparatus of FIG. 1.

Referring to FIG. 1, a flow measurement apparatus 100 is shown according to one embodiment, having a plurality of pressure sensors in an arrangement 114, (in one example, a minimum of five high frequency pressure sensors 117, 119, 121, 123 and 125), and dual junction thermocouples, mounted in a layout that minimizes the probe diameter and length of the pneumatic line between the probe head housing 112 and pressure sensors. FIGS. 2A and 2B show front and rear external views, respectively of the apparatus 100. The apparatus 100 optionally incorporates cooling passages to ensure adequate cooling of the pressure sensors. The apparatus 100 allows for mounting current available pressure sensors, operational only at low temperature with a couple of pressure sensors mounted side by side as shown to ensure minimum probe volume. In certain embodiments, the sensors 117, 119, 121, 13 and 125 are Kulite sensors, having a diameter in the range of 1-5 mm. FIG. 3 illustrates a dual wire thermocouple apparatus 130 wherein the thermocouples 132 provide temperature feedback and measurement to allow further flow velocity and flow calculations to be made by the apparatus 100. FIG. 4 shows the inner tubing and sensor apparatus of the probe which is mounted within the housing 112. The probe head geometry incorporates a plurality of pressure tappings located at positions that maximize the sensitivity to flow angle, while minimizing sensitivity to pressure and temperature. A frontal central tapping hole 124 in the housing delivers a pressure reading close to the total pressure via tube 165 and sensor 125. At least three more pressure tapping holes (116, 118 and 120) are located in the probe frontal side of the housing 112 and directed to corresponding tubes 161, 162 and 163 and sensors 117, 119 and 121 as shown to maximize the sensitivity to yaw and pitch angles. A minimum of one pressure tapping from hole 122 in the rear of the tube stem 110 delivers the base pressure via tube 164 and sensor 123, which is used to correct the angular data, and measure flow angles in the transonic range with higher accuracy. (FIG. 1—right). The diameter of the holes 116, 118, 120, 122 and 124 may be in the range of 0.1-0.5 mm.

In certain embodiments, the probe head housing 112 may be hemispherical, for example in applications that require maximum accuracy in the total pressure and minimization of the vortex shedding effects. In other embodiments, the probe head housing 112 may have a conical shape to maximize the angular sensitivity. The head housing 112 shape may optionally have a smooth surface, with dimples, wavy, or distributed roughness to adapt the operation to the adequate range of Reynolds numbers as required by a particular application.

Figure 5:
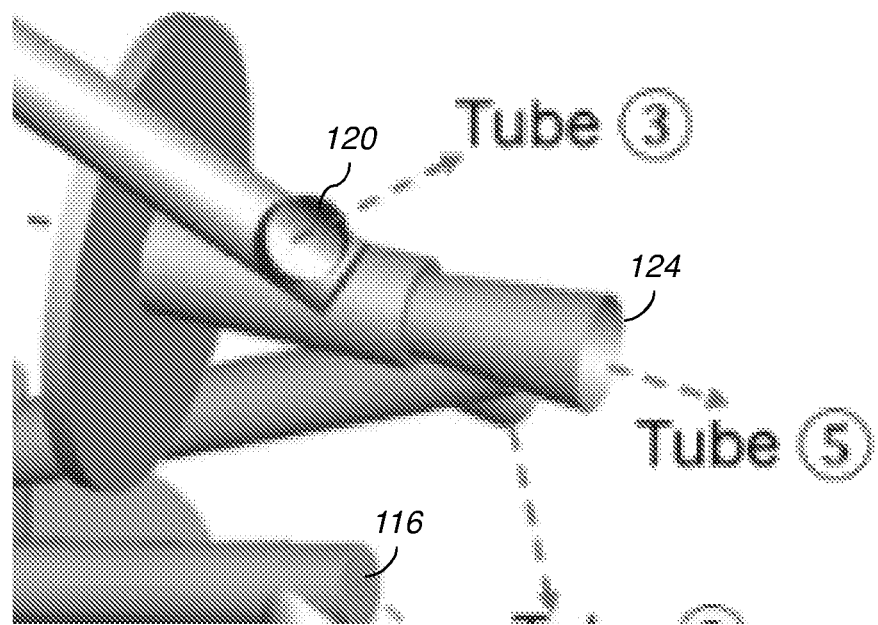
FIG. 5 shows a pressure tapping having a chamfered cavity according to one embodiment.

The main pressure tapping tube 125 is preferably perpendicular to the probe head housing surface, to deliver a wide calibration map without any overlapping in a wide range of flow angles. The cavity of the pressure tapping is chamfered as shown in FIG. 5 to maximize the accuracy at high angles, minimize the inaccuracies created during the manufacturing, and reduce the Reynolds effects created by separation bubbles anchored at the pressure tappings. The pressure taping tubes, probe stem and probe housing may be constructed from stainless steel, Iconel, Monel or other suitable material depending on the needs of the application.

In certain embodiments, the pressure tapping lines may be filled with fluids denser than air, such as liquids, to increase the frequency response, due to an increase in speed of sound. In such embodiments, a diaphragm may be used in the cavity of the pressure sensor. The included diaphragm in the inner portion between the liquid and the high temperature air being measured protects the sensor and the fluid from any external harsh environment to the probe.

Figure 6:
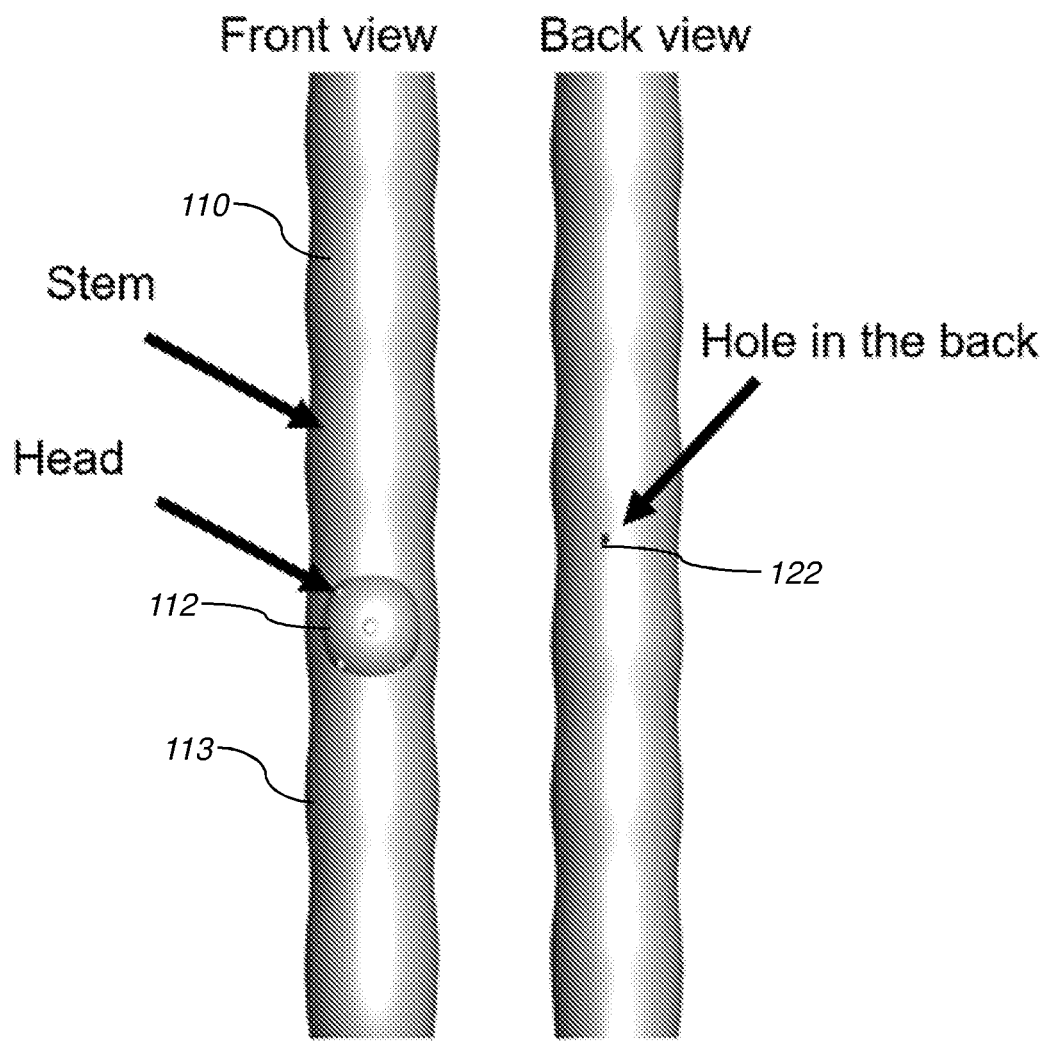
FIG. 6 shows a probe stem having an undulated exterior surface according to one embodiment.

The probe stem 110 shape may optionally comprise a wavy or undulated exterior shape 113, as shown in FIG. 6, to reduce and potentially eliminate the disturbance created by the vortex shedding, and therefore reduce the distortion created at that frequency on the pressure tapping locations, and pressure sensors. The stem design is wavy or undulated, adapting the radius of curvature to the probe diameter, and the range of velocities. The stem shape may also incorporate other shapes such as dimpled, sinusoidal, and edgy.

In certain embodiments, the probe apparatus 100 may comprise one or more heat pipes to thermally protect the sensors. In such embodiments, the cooling fluid enters the probe through cooling channels, changes phase and is absorbed by the porous material and extracted from the probe due to the difference in pressure. Additionally, the working fluid is a closed loop circuit. For high temperature applications, lithium is one example suitable liquid, with properties listed below:

| 1100 | 1825 | Lithium | Tungsten, Niobium. Molybdenum, TZM | Lithium not compatible with superalloys. Refractory metals react with air |
|---|---|---|---|---|

Figure 7:
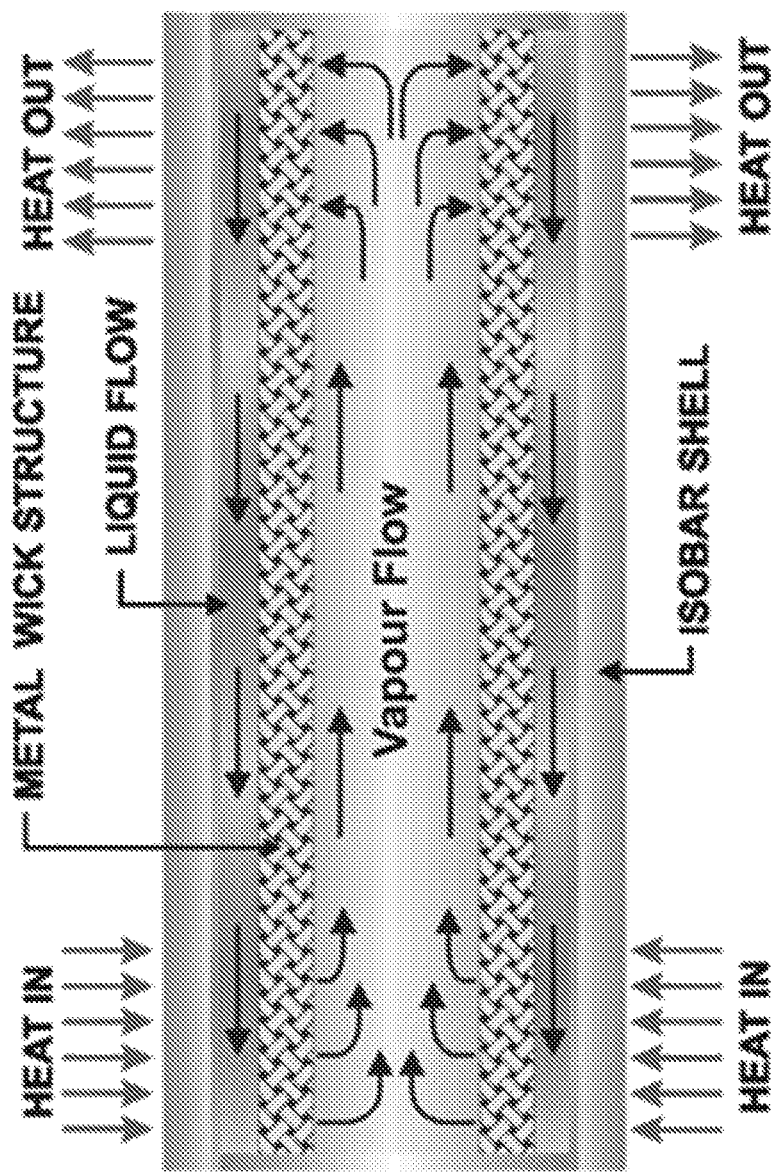
FIG. 7 shows a diagram of a heat pipe according to one embodiment.
Figure 8:
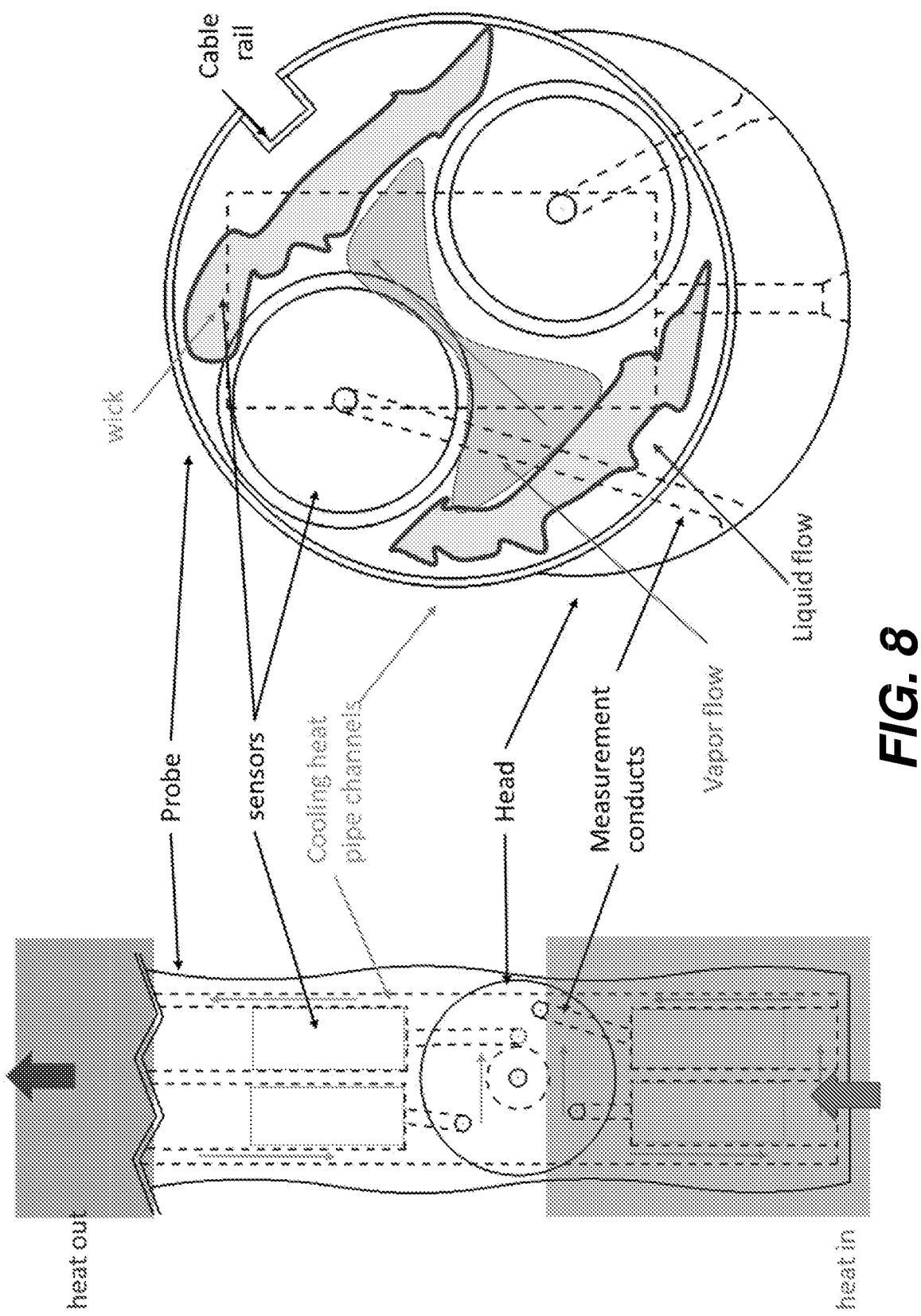
FIG. 8 shows a probe apparatus with cooling heat pipe channels incorporated into the apparatus according to one embodiment.

FIG. 7 illustrates the working principle of a heat pipe. FIG. 8 shows an example layout of a probe apparatus with cooling heat pipe channels incorporated into the apparatus 100 as described above. The fluid used for cooling (e.g., lithium) improves the frequency response in the probe cavity as described above, as well as providing cooling. In certain embodiments, the cooling fluid may comprise the fuel being used or burned in the application, the combustion of which produces the exhaust flow being measured by the apparatus 100.

In certain embodiments, the probe material may include carbon nanotubes or a carbon matrix composite (CMC) in the material that may or may not be aligned in the longitudinal direction of the probe to increase the mechanical resistance and modify thermal conductivity. In other embodiments, the probe may be formed of a porous material filled with a liquid due to capillarity, thereby enhancing the cooling of the probe by evaporating the liquid through the pores of the material. This provides transpiration cooling which decreases the heat load on the probe. In certain embodiments, a continuous cooling circuit may be used instead of a heat pipe to provide cooling to the probe. The refrigerant may be cooled with a continuously injected coolant, whereby the heated coolant is afterwards ejected into the main flow.

The pressure sensor may be coated with a high temperature resistive coating to allow a decrease in the heat flux towards the directional probe.

In certain embodiments, a cavity of the probe may be used to eject particles for optical measurements. The particles can be used to determine the skin friction or provide other measurements.

The pressure sensors or transducers contained within the probe may optionally comprise wireless communication modules to transmit the sensed pressure readings wirelessly to an external receiver for further processing. In other embodiments, the pressure sensors are connected to the external receiver by a wired connection.

The probe, pressure sensors, and external receiver may be connected to one or more computer processors and associated memory for processing, storing, and outputting various data and measurements as described herein.

In certain embodiments, a filtering and/or recording function of the pressure readings may be provided by software running on the one or more computer processors. The software may be built upon progressive, gradient, or progressive gradient methods depending on the needs of the application. In order to calculate the flow quantities using the unsteady pressure measurements received from the probe, a calibration algorithm may be applied to the received signals to determine one or more properties of the fluid being measured, including velocity magnitude, velocity direction, mach number, unsteady total pressure, unsteady static pressure, turbulence intensity, three-dimensional velocity component fluctuations, turbulence length scale, and/or humidity. Such postprocessing may further comprise an artificial neural network or a Kalman filter and sensor fusion. Inverse methodologies may also be used to retrieve flow quantities in the rotating frame of reference using measurement in the stationary frame in the postprocessing tool or software.

Those skilled in the art will recognize that numerous modifications can be made to the specific implementations described above. The implementations should not be limited to the particular limitations described. Other implementations may be possible. While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:
1. A flow measurement apparatus, comprising:
 a. an elongated mounting stem having an inner stem cavity, the mounting stem configured to be mounted in an area of flow to be measured;
 b. a probe housing having a surface and mounted to an outer surface of the mounting stem and positioned on an upstream side of the mounting stem, the probe housing comprising a first hole near a center point of the housing and a second, third and fourth hole positioned near the perimeter of the housing;

c. a fifth hole located on a downstream side of the mounting stem;
d. at least five pressure sensors; and
e. a plurality of pressure tapping tubes connecting the respective holes to the corresponding pressure sensors.

2. The apparatus of claim 1, wherein the probe housing is hemispherical.

3. The apparatus of claim 1, wherein the probe housing is conical.

4. The apparatus of claim 1, wherein the probe housing surface is smooth.

5. The apparatus of claim 1, wherein the probe housing surface is dimpled.

6. The apparatus of claim 1, wherein a majority of the probe housing surface is wavy.

7. The apparatus of claim 1, wherein the probe housing surface has a distributed roughness.

8. The apparatus of claim 1, wherein the pressure tapping tubes are perpendicular to the surface of the probe housing.

9. The apparatus of claim 1, wherein a pressure tapping portion of each of the plurality of the pressure tapping tubes are chamfered, with the larger diameter of the chamfer connected to the associated hole.

10. The apparatus of claim 1, wherein the pressure tapping tubes are filled with a fluid denser than air.

11. The apparatus of claim 10, wherein the fluid is a liquid.

12. The apparatus of claim 1, wherein a diaphragm is positioned in each of the plurality of the pressure tapping tubes to increase frequency response.

13. The apparatus of claim 1, wherein the mounting stem has an undulated surface profile.

14. The apparatus of claim 13, wherein a radius of the undulated surface is substantially equal to a radius of the probe housing.

15. The apparatus of claim 1, further comprising at least one heat pipe to provide cooling to the pressure sensors.

16. The apparatus of claim 15, wherein a cooling fluid is provided through the heat pipe, the cooling fluid changing phase and being absorbed by a porous material in the heat pipe and extracted from the probe housing.

17. The apparatus of claim 1, further comprising carbon nanotubes or carbon matrix composite within the material of the mounting stem or the probe housing.

18. The apparatus of claim 1, wherein the mounting stem or probe housing comprise a porous material.

19. The apparatus of claim 18, wherein the porous material is filled with a liquid to enhance cooling of the probe housing.

20. The apparatus of claim 1, wherein the probe housing is cooling via a continuous cooling circuit.

21. The apparatus of claim 1, wherein the pressure sensors are coated with a high temperature resistive coating.

22. The apparatus of claim 1, wherein a coolant is continuously injected into the probe housing and is removed through a flow of liquid being measured.

23. The apparatus of claim 1, wherein optically visible particles are ejected from a cavity of the probe housing for measurement.

24. The apparatus of claim 1, wherein the pressure sensors are connected to one or more wireless communication modules which transmit data from the pressure sensors wirelessly to an external receiver.

25. The apparatus of claim 1, wherein an external receiver receives data from the pressure sensors and applies a filtering function.

* * * * *